Dec. 22, 1942.　　G. H. SCHIEFERSTEIN　　2,305,795
RESILIENT MEMBER
Filed Nov. 4, 1938　　2 Sheets-Sheet 1

Inventor
Georg Heinrich Schieferstein
By
Attorney

Dec. 22, 1942.  G. H. SCHIEFERSTEIN  2,305,795
RESILIENT MEMBER
Filed Nov. 4, 1938  2 Sheets-Sheet 2
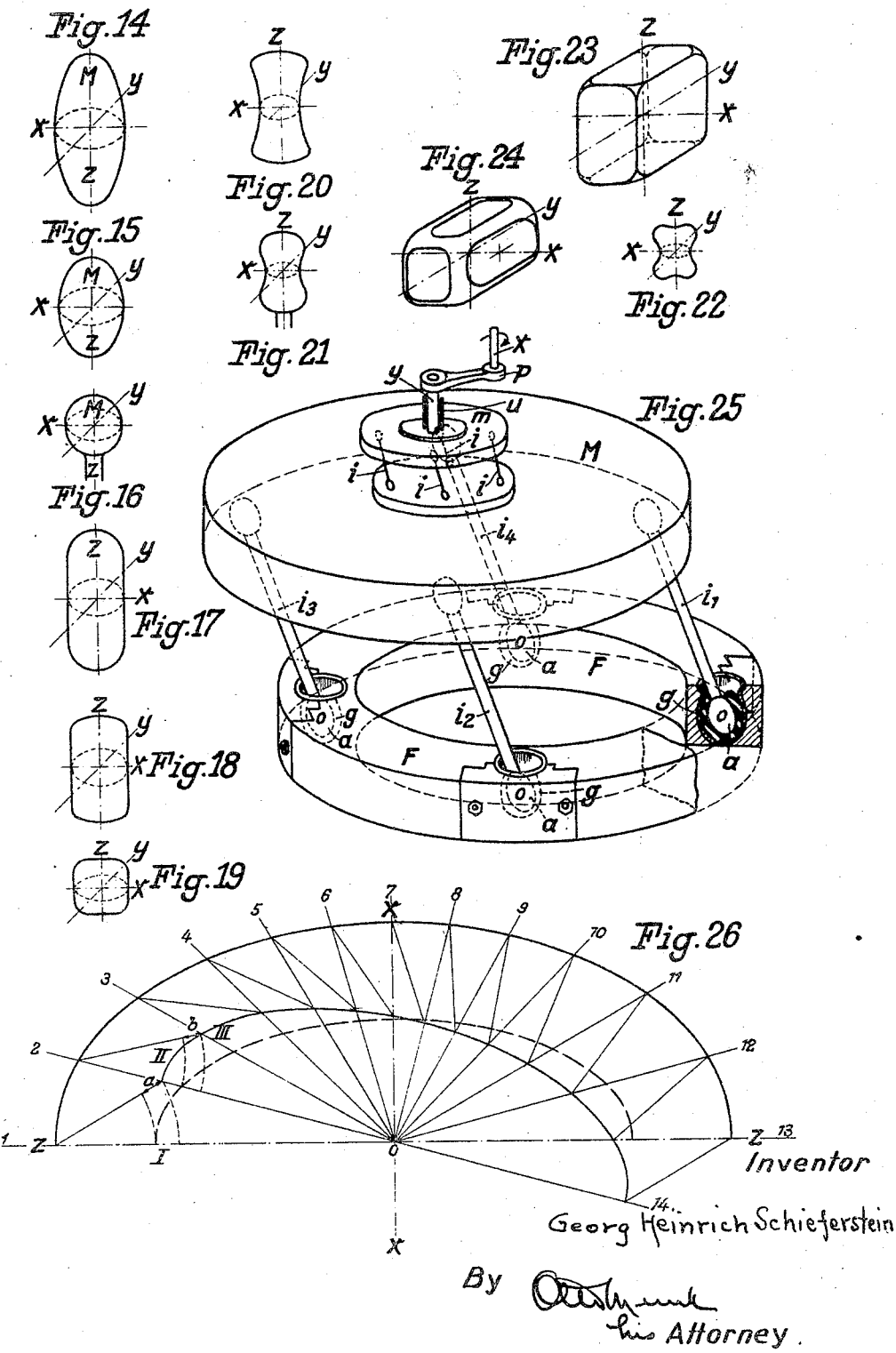
Inventor
Georg Heinrich Schieferstein
By
his Attorney.

Patented Dec. 22, 1942

2,305,795

UNITED STATES PATENT OFFICE 2,305,795

RESILIENT MEMBER

Georg Heinrich Schieferstein, Finowfurt, near Eberswalde, Germany; vested in the Alien Property Custodian Application November 4, 1938, Serial No. 238,756
In Germany November 4, 1937

2 Claims. (Cl. 280—96.2)

The present invention relates to a resilient member and more particularly to a rubber spring, especially for vehicles.

One object of the invention is to provide a rubber spring which is capable of taking up small and large forces occurring in any direction of the three dimensional space.

Another object of the invention is to construct a spring which will transmit any energy quantum on any open or closed oscillation path.

A still further object of the invention is to produce a rubber spring which will take up forces occurring in any direction of the three-dimensional space in a substantially unharmonic manner, whereby a disproportional increase in the spring resistance occurs with increasing deformation of the spring.

According to the invention, these and other objects, which will appear more clearly as the specification proceeds, are accomplished by the arrangement and combination of elements set forth in the following detailed description, defined in the appended claims, and illustratively exemplified in the accompanying drawings, in which:

Figure 12:
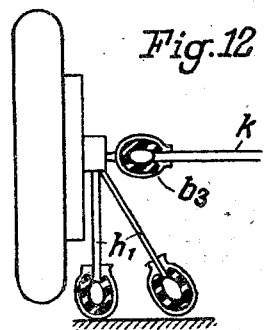
Figure 13:
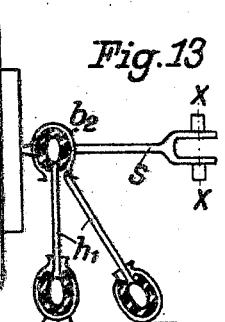

Figs. 12 and 13, respectively, show partly in elevation and partly in section two rubber spring arrangements according to the invention as applied to the rear wheels of a car.

Figs. 14 to 22 are diagrammatic elevations of 9 different modifications of the inner metallic spring body according to the invention.

Figs. 23 and 24 are perspective views of two further embodiments of an inner metal spring body, respectively.

Fig. 25 is a perspective view of a vibratory arrangement provided with springs according to the invention, and Fig. 26 is a diagram showing the force distribution around the elliptical section.

Figure 1:
Fig. 1 is a diagrammatic view of an inner ellipsoid metal body of a spring according to the invention.
Figure 3:
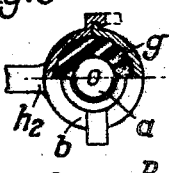
Figs. 2 to 6 are, respectively, sectional views of several assembled spring constructions according to the invention, each having a single spring arrangement on one end of a lever, the inner body of each spring arrangement and the lever being shown in elevation.

Referring to Fig. 1, $a$ is an ellipsoid which may be a rotation body with the longer ellipse axis as rotation axis. The ellipsoid $a$ supports a lever $h_1$, as shown in Figs. 2 to 6, and it is enveloped by a rubber layer $g$ adhesively secured to its metallic surface. The rubber layer $g$ is surrounded by and adhesively secured to a metallic hollow member $b$ which in its turn is connected to a lever $h_2$, as shown in Fig. 3, or to a base frame $r$, as shown in Figs. 2, 4, 5 and 6. In this arrangement it is possible, by acting on the lever $h_1$, to angularly displace the ellipsoid $a$ in any radial direction from its original longitudinal axis.

During such angular displacement the inner ellipsoid is turned with respect to the hollow member around an axis passing through the center of gravity, and it exerts on the rubber layer $g$ several kinds of stresses, which according to Fig. 26 are pressure, tensile stress, torsion and shearing stress.

The fact that each minute particle of rubber of the surrounding rubber jacket participates in these stresses, irrespectively of the direction in which they occur, makes it possible to bring into play exorbitant forces of resistance inside the space filled with rubber, or to store surprisingly large amounts of potential energy. In addition, it is seen from the fact that these forces are induced in the immediate vicinity of the center of gravity of the ellipsoid and may be conveyed to the outside through the medium of a lever with a leverage which may under certain circumstances be very great, that the designer is enabled to employ the quantity of energy available for a relatively long path and a small force, or for a relatively short path and a large force, depending on the selection of the leverage.

With regard to the nature of the course of the vibration, it must be recalled that the resulting directing forces increase progressively more rapidly as the ratio of the longitudinal axis of the ellipsoid to its transverse axis is increased.

Figure 5:
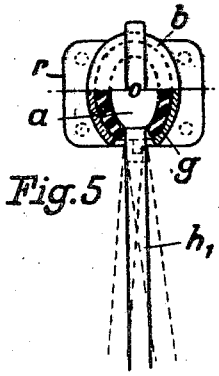
Figure 6:
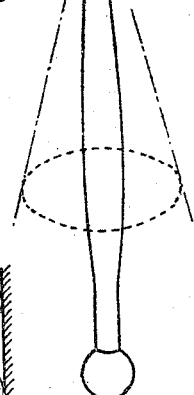
Figure 8:
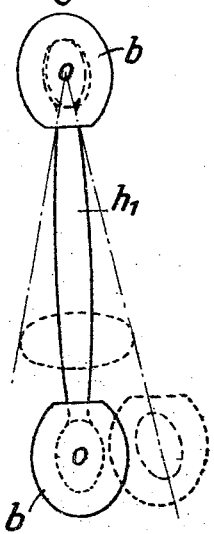
Fig. 8 is a diagrammatic elevation of a construction in which a lever is provided with a rubber spring arrangement according to the invention at each end thereof.

If the lever $h_1$ is moved around in a circle from one deflected position to the other, it describes around the center of gravity "o" of the ellipsoid the conical path shown in broken lines (Figs. 5, 6 and 8).

Figure 9:
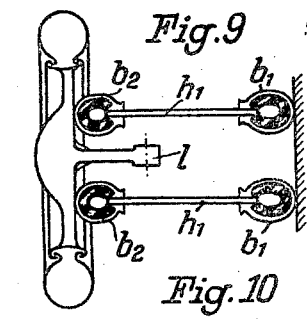
Fig. 9 is a vertical section of the front wheel of a motor-car supported by a spring construction according to the invention.
Figure 10:
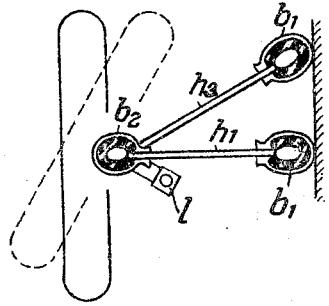
Fig. 10 is a top plan view of the arrangement shown in Fig. 9.

A rubber spring of the type shown in Fig. 8, is adapted, for example, for use in vehicle construction as a front wheel spring, as shown in Figs. 9 and 10, in which $l$ indicates the steering lever. The required stability can be obtained by means of the supporting spring $h_3$ visible in Fig. 10, said supporting spring being fitted to one or both of the springs $h_1$, $h_1$ seen in Fig. 9. In this arrangement, the spring heads $b_2$, $b_2$ on the steered wheel may be equipped with approxiately or completely spherical inner bodies, while the spring heads secured to the frame of the vehicle are given the form of elongated, unharmonically acting ellipsoids. Spherical inner bodies have a smaller resistance, which may be utilized for the automatic restoring of the steered wheels to the middle position.

Figure 11:
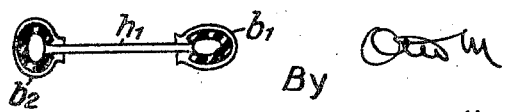
Fig. 11 is a sectional view of a modified spring construction applicable to car wheels.

This result may also be attained if, in the spring $h_1$, the axis of rotation of the ellipsoid is placed horizontally on the frame and vertically on the steered wheel, as shown in Fig. 11.

If the invention is to be utilized as a rear wheel spring for vehicles, the arrangement of Figs. 12 or 13 may be adopted.

In the case of Fig. 12, the wheel is firmly united with the springs $h_1$, $h_1$ and is able to yield vertically with these resilient means. The drive is effected through a Cardan shaft $k$ by means of a spring head $b_3$. In the case of Fig. 13, the spring heads $b_1$, $b_1$ act exactly as in the case of Fig. 12, but on the other hand the ellipsoid $b_2$ is stressed as a cardan by turning and bending stresses about its own axis, since the axle $S$ vibrates about $xx$.

In Figs. 14, 15 and 16 three ellipsoids are shown with different axial relationships.

In Fig. 14 the ratio of the longitudinal axis $z$ relatively to the two transverse axes $xy$ is large, in Fig. 15 it is smaller, and in Fig. 16 the relation between the axis of rotation $z$ and the two transverse axes $xy$ approximates the value unity of the spherical form.

The modification of an ellipsoid in accordance with Fig. 14, when used in a spring according to Figs. 2 to 8, provides a rapidly and progressively rising resistance curve, i. e. an unharmonic vibration which can never attain or exceed the resonance position.

The ellipsoid of Fig. 15 exhibits a slowly rising progressive tension curve and the tension curve of the ellipsoid of Fig. 16 approximates very closely a linear form.

The bodies of rotation shown in Figs. 17, 18 and 19 behave similarly. Here again the greatest progressive action occurs in Fig. 17, a medium action in Fig. 18 and a hardly perceptible action in the case of Fig. 19.

The bodies shown in Figs. 17 to 19 are substantially to be regarded as cylinders rounded off in any way at the ends, which are cheaper to make than the bodies shown in Figs. 14, 15 and 16, but on the other hand the bodies shown in Figs. 17, 18 and 19 (as can be deduced from Fig. 26) act less favorably as regards the utilization of the rubber than the bodies shown in Figs. 14 to 16.

Even less advantageous in this regard is the action of the bodies shown in Figs. 20, 21, 22, although the desired progressive action can also be obtained therewith.

By diverging from bodies of rotation, as is shown in Figs. 23 and 24, i. e. by building a prism with rounded corners the dimensions of which are different in the three space axes, in accordance with Fig. 23 as extreme case, the effect may be obtained that different forces of resistance are induced in the different space axes.

The edges of such a prism may naturally also be remarkably rounded off, as shown in Fig. 24, whereby such a body approximates in its action the bodies shown in Figs. 17, 18 and 19 particularly when the two space axes $x$ and $y$ are equal in length. Prisms with rounded off edges may therefore also be fitted to the ends of levers as the inner bodies of springs which are surrounded by adhesively secured rubber layers.

The following are the principles underlying the present invention:

A body consisting of metal, which is preferably coated with a layer of rubber of uniform thickness, the latter being in turn enclosed by a hollow body of corresponding shape, is able, when given the form of a body of rotation (an ellipsoid), to perform oscillations on a closed path, while each point of a lever fastened to the ellipsoid describes a circle and the force curve increases progressively more rapidly the greater the axis of rotation $z$ is made with relation to the two equal axes $x$ and $y$ of the ellipsoid.

If the axis of rotation $z$ of the metal body in the form of an ellipsoid is selected so as to become increasingly smaller and smaller in relation to the two other space axes $x$ and $y$, the progressive increase of the force curve diminishes until all three space axes are equal and a sphere has thus been formed from the ellipsoid.

The progressive increase of the resistance curve then assumes the smallest value and, on further decrease of the axis of rotation $z$ or on increase of the two space axes $x$ and $y$, this value increases again towards the infinite value.

If, in place of an ellipsoid, similar bodies are employed, such as cylinders the end faces of which are rounded off, as in Figs. 17 to 19, or bodies of rotation which are hollowed out, as in Figs. 20 to 22, the foregoing remarks apply appropriately, it being understood that the utilization of the rubber is reduced accordingly.

With prismatic bodies provided with remarkably rounded off edges, in accordance with Figs. 23 and 24, similar results are obtained.

All the foregoing springs perform so-called pseudoharmonic, i. e. unharmonic, vibrations by reason of the progressive increase of the curve of tensions. Only when a linear rise is attained, i. e. when two space axes of the metal bodies employed are equal in length, will harmonic vibration with a decidedly fixed resonance position be obtained. Such vibrations are as unsuited to the practice of vehicle construction as they are to the practice of resonance machine construction, because with vibration of this type, in the first place, the springing is disturbed and, in the second place, there is the risk that the resonance machines will fall out of step.

The desired effect of all the foregoing springs undergoes an increase if the annular rubber body is adhesively secured, where possible, to the inner and outer metal mounts, as detrimental damping losses are thereby prevented and the tensile stresses occurring cannot cause the rubber to be detached from the metal.

As measurements have shown, the springs of the present invention take up a potential energy of many thousand mkg., depending on the dimensioning, with a single deflection of the middle position, and make it possible to transmit this idle power energy on any desired large path with small force and on any desired small path with large force. In addition, springs built in accordance with the present invention, afford the exceptional advantage that they vibrate symmetrically around a zero position which adjusts itself automatically. The spring therefore acts in all cases like a helical spring of metal subjected to tensile and compressive stress, with the sole difference that the metal spring describes only harmonic vibrations, while the rubber spring of the invention can perform pseudoharmonic vibrations of any desired degree.

Since the springs of the present invention can swing out in all directions starting from the center of gravity of the ellipsoid, they are naturally also adapted to vibrate towards a clearly defined side, describing an open curve, in which case they move automatically transversely to the direction of vibration on a line that is to be regarded as the middle position, i. e. the zero position.

This property, based on the resiliency of said spring in all directions in the space, is also a particular advantage of the present invention.

In order to perform circular oscillations utilizing the means of the present invention, a vibratable system is required, which consists, for example according to Fig. 25, of a mass M which is resiliently mounted, by means of four springs $i_1$ to $i_4$ of the type described, on the base F. As seen four ellipsoids are built into the mass M, on the one hand, and the base F on the other hand, a rubber ring $g$ being interposed in each case. The mass M accordingly, starting from a middle position can perform vibrations in the direction of all radii and can also describe circular vibrations about its own center. For this purpose a so-called loose coupling is required, i. e. a resilient structure similarly shaped but of substantially smaller dimensions. In the embodiment shown, the loose coupling consists of a disc $m$ which is connected to the mass M, likewise by springs of the type described and illustrated. The force $k$ that is required to deflect the coupling spring $i$ must then bear the relationship $2\theta$ to the force K that is available to deflect the collecting springs $i_1$ to $i_4$, i. e. the double decrement of the damping.

The coupling device described is completed by a crank $p$ rotating about a shaft $x$ and engaging with its pin $y$ a bearing $u$ on the coupling, said crank causing the coupling to perform circular movements. Through this circular movement, which is permitted by the resilient springs $i$, the mass M is likewise caused to perform circular vibrations, as demonstrated.

Figure 2:
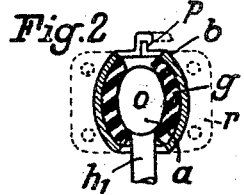
Figure 4:
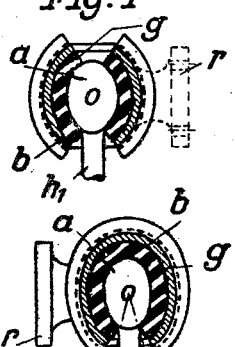
Figure 7:
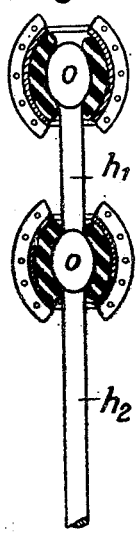
Fig. 7 is a substantially sectional view of a construction in which a lever is provided with one spring arrangement at one of its ends and with a second spring arrangement intermediate its ends.

The outer shell of the spring described and illustrated may be composed of two parts, each half being provided with flanges, as shown in Fig. 7, and held together by rivets or screws, or, as shown in Figs. 2, 3 and 5, one of the flanges may be furnished with a rectangularly turned up rim $p$, which is flanged over and holds both halves firmly together.

The scope of the invention also includes the use of ellipsoids at one or both ends of a lever $h_1$, the axis of rotation $z$ of which is shorter than the other space axes $x$ and $y$.

The springs for the individual purposes differ practically in that in all cases where the spring is to have an energy-damping action, as in vehicle construction, a type of rubber is selected that exhibits relatively great hysteresis losses, while for resonance machines types of rubber are employed the hysteresis curve of which encloses only a small damping area.

The amount of shortening, lengthening and twisting undergone by a spring in accordance with the present invention can be seen from the theoretical drawing in Fig. 26. Vectors 1 to 14 have been drawn from the center of gravity and the zero position of the inner ellipsoid is shown in broken lines.

If the outer metal body, shaped ellipsoidally as a hollow body, is imagined to be held firm, and the inner ellipsoid is turned around its center of gravity O, the point I, where the vector 1 penetrated the inner ellipsoid, is moved to the point II, whereby the rubber is subjected to a tensile stress, which is characterized by the distance $a$. The point on the inner ellipsoid where the vector 2 penetrated its surface lies in this case at III, and so on.

Simultaneously with these tensile stresses on the aforesaid rubber parts, however, compressive stresses are also transmitted transversely to the vectors, because the inner ellipsoid approaches the outer ellipsoid, and finally the rubber is also subjected to shearing stress by the relative sliding of the inner and outer surfaces.

The cross-section in which the rubber stresses are shown passes through the axes $x$ and $z$, so that the $y$ axis penetrates the space at O at right-angles to the surface of the paper and is to be regarded as the axis of rotation in the operation described.

If the operations which take place in a sectional surface parallel to the first mentioned are examined, a smaller ellipse is naturally obtained, whereby all the magnitudes shown in the drawings also undergo a decrease, i. e. each particle of rubber is correspondingly affected by the twisting of the ellipsoids.

If the spring performs circular vibrations, the direction of the stressing constantly changes, and thus the stresses in the individual sectional surfaces, which naturally run with the circular vibration, also change constantly.

I claim:
1. A resilient connection between the chassis and a front wheel of a vehicle, said connection comprising a first member including an inner metal body having the outer shape of an elongated ellipsoid, a coating of soft resilient material surrounding said body, and a hollow outer metal body having an inner shape corresponding to the outer shape of said inner body, one of said bodies being secured to the chassis, a lever having one end thereof rigid with the second metal body of said first member, and a second member including an inner metal body having the outer shape of an ellipsoid approaching spherical shape, a coating of soft resilient material surrounding said body, and a hollow outer metal body having an inner shape corresponding substantially to the outer shape of the inner body of said second member, one body of said second member being rigid with the other end of said lever and the other body of said second member being secured to the front wheel.

2. A resilient connection between the chassis and a front wheel of a vehicle, said connection comprising two members each including an inner metal body having an outer shape corresponding substantially to the surface of an ellipsoid with two short axes and a long axis, a coating of soft resilient material surrounding said body, and a hollow outer metal body having an inner shape substantially similar to the outer shape of said inner body and a lever connecting said two members, one metal body of one of said members being secured to the front wheel with the long axis of the ellipsoid extending substantially in vertical direction, said lever being at one end thereof rigid with the second body of said first member and projecting therefrom at substantially right angles to the long axis of the ellipsoid, one body of the second member being rigid with the other end of said lever and having at long axis disposed in alignment with said lever, the second body of said second member being secured to the chassis.

GEORG HEINRICH SCHIEFERSTEIN.